Oct. 10, 1933.    G. A. ROBERTS ET AL    1,930,253
ACCOUNTING MEANS
Original Filed June 20, 1929    7 Sheets-Sheet 1

FIG.1.

| Paid | | | | | | | | | |
|------|---|---|---|---|---|---|---|---|---|
| 30 30 30 12 | | | | | | | | | |
| Coin Read Date Mo | | | | | | | | | |
| 20 20 20 11 | R-B | | Book | R | Present Reading | Previous Reading | Consumption | Amount | Bill No |
| 10 10 10 10 | O | C-B D-R | O O O O | O L C | O 0 0 0 0 | O 0 0 0 0 0 | O O O O 0 | O O O 0 0 0 | 0 0 0 0 0 |
| | 1 | O Del K-R | 1 1 1 O | O W S | 1 1 1 1 1 | 1 1 1 1 1 1 | 1 1 1 1 O | 1 1 1 1 1 1 | 1 O 1 1 1 |
| | 2 | R-V | 2 2 2 2 | P G | 2 O 2 2 2 | 2 2 O 2 2 2 | 2 2 2 O 2 | 2 2 2 O 2 2 | 2 2 2 2 2 |
| | 3 | T-V | 3 3 3 3 | C-R D-D | 3 3 3 3 3 | 3 3 3 3 3 O | 3 3 3 3 3 | 3 3 3 3 3 O | 3 3 O 3 3 |
| | 4 | A-V | 4 4 4 4 | M-R P-L | 4 4 4 4 O | 4 4 4 4 4 4 | 4 4 4 4 4 | 4 4 4 4 4 4 | 4 4 4 4 4 |
| | 5 | A-Y | 5 5 5 5 | | 5 5 5 5 5 | 5 5 5 5 5 5 | 5 5 5 5 5 | 5 5 5 5 5 5 | 5 5 5 5 5 |
| | O | A-Y | 6 6 6 6 | C-R O-U | 6 6 6 6 6 | 6 6 6 6 6 6 | 6 6 6 6 6 | 6 6 6 6 6 6 | 6 6 6 6 O |
| | 7 | | 7 7 7 7 | D-R I | 7 7 O 7 7 | 7 7 7 O O 7 | 7 7 7 7 7 | 7 7 7 7 O 7 | 7 7 7 7 7 |
| | 8 | | 8 8 8 8 | 8 8 A | 8 8 8 8 8 | 8 8 8 8 8 8 | 8 8 8 8 8 | 8 8 8 8 8 8 | 8 8 8 8 8 |
| | 9 | | 9 9 9 9 | 9 9 O | 9 9 9 O 9 | 9 9 9 9 9 9 | 9 9 9 9 9 | 9 9 9 9 9 9 | 9 9 9 O 9 |

| 2-1768 | | | | | 1396 |
|--------|--|--|--|--|------|
| | | | | | |
| PRESENT READ. | PREVIOUS READ. | CONSUMPTION | AMOUNT | | AMOUNT DUE |
| | | | | | |
| 2794 | 2773 | 21 | 2.73 | LIGHT | 2.73 |
| 834 | 824 | 10 | 1.30 | WATER | 1.30 |
| | | | 4.03 | DUE | 4.03 |

INVENTOR-
Gordon A. Roberts
Sherwin K. Decker
BY
ATTORNEY

Oct. 10, 1933.     G. A. ROBERTS ET AL     1,930,253
ACCOUNTING MEANS
Original Filed June 20, 1929     7 Sheets-Sheet 2

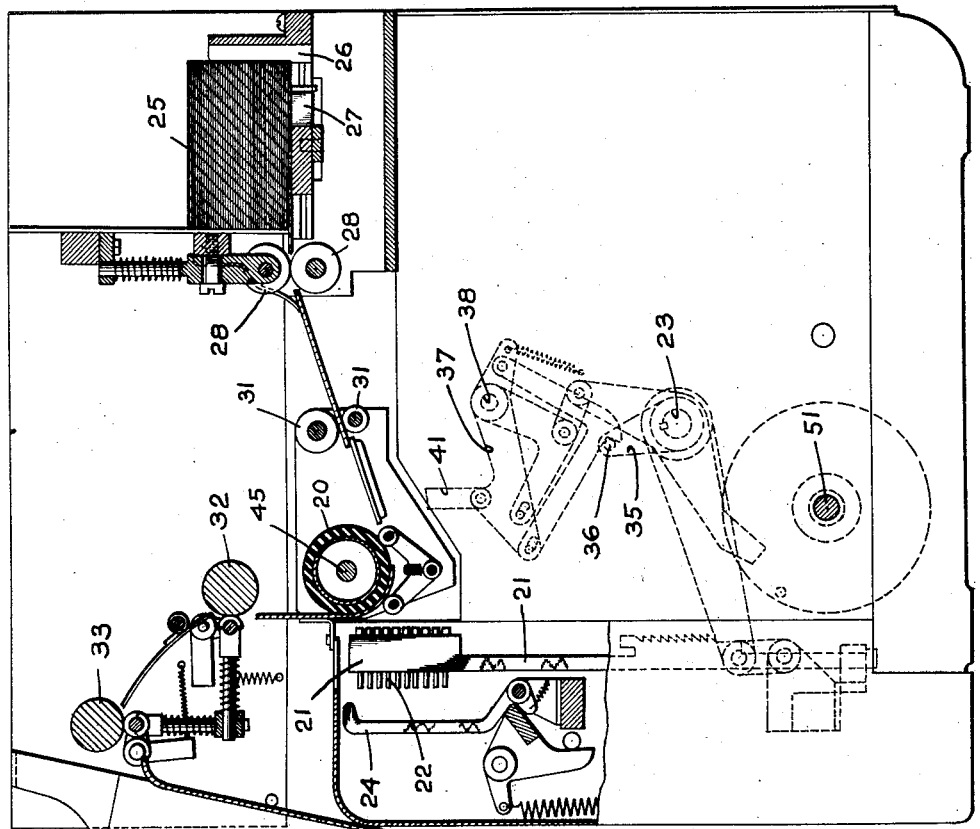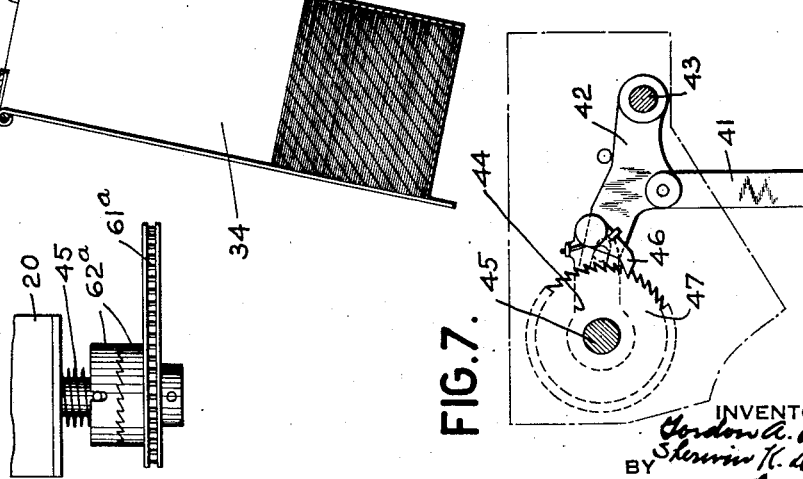

Oct. 10, 1933.   G. A. ROBERTS ET AL   1,930,253
ACCOUNTING MEANS
Original Filed June 20, 1929    7 Sheets-Sheet 5

Oct. 10, 1933.     G. A. ROBERTS ET AL     1,930,253
ACCOUNTING MEANS
Original Filed June 20, 1929    7 Sheets-Sheet 6

Oct. 10, 1933.     G. A. ROBERTS ET AL     1,930,253
ACCOUNTING MEANS
Original Filed June 20, 1929     7 Sheets-Sheet 7

INVENTORS
Gordon A. Roberts
Sherwin K. Slicker
BY
Wm. Wilson
ATTORNEY-

Patented Oct. 10, 1933

1,930,253

UNITED STATES PATENT OFFICE 1,930,253

ACCOUNTING MEANS

Gordon A. Roberts, Pelham Manor, N. Y., and Sherwin K. Decker, Los Angeles, Calif., assignors, by mesne assignments, to International Business Machines Corporation, New York, N. Y., a corporation of New York Original application June 20, 1929, Serial No. 372,367, and in Great Britain September 5, 1928. Divided and this application December 1, 1931. Serial No. 578,252

8 Claims. (Cl. 101—93)

The invention concerns mechanism designed to extend the utility of mechanical accounting systems of the perforated card type and has for its principal object the provision of devices facilitating the use of perforated cards as ledgers in businesses which have large numbers of small accounts.

An equally important object is the provision of such mechanism which permits statements, bills or invoices to be prepared directly from such perforated ledger cards by the use of well known types of tabulating machines thus obviating the necessity for clerical work in the preparation of such statements.

The present application is a division of copending application Serial No. 372,367, filed June 20, 1929.

The invention, while adapted to various uses, will be illustrated and described in connection with the accounting system of a public utility corporation supplying services in connection with water, light, power, gas and the like. It is customary to install meters on the premises of users of water, electricity and gas on which the consumption of these several commodities is registered. An employee of the corporations makes periodic visits to read the meters, entering the readings in a meter read book which forms the book of original entry. This book shows the last previous and present readings of the meters and the difference between the two, representing the consumption of the commodity during the selected period. According to the present invention it is proposed to form perforated ledger cards from these books of original entry. The ledger cards are punched in differential locations, in the well known manner, to represent different data and ordinarily a single card is prepared for the consumption of each commodity by each consumer during the accounting period. Thus each ledger card is punched with identifying data of the consumer, identifying data of the particular commodity, present and previous readings of the meter, the difference between the readings, representing consumption during the period, and the amount due for this consumption.

These punched cards constitute the sole ledger and obviously present all the advantages for auditing and statistical purposes which usually result from these mechanical accounting systems.

The statements, bills or invoices which are sent out to consumers at the end of the accounting period may be prepared directly from the perforated ledger cards. Each consumer may have a card for gas consumption, another for water consumption and a third for electricity consumption. The cards of each consumer are collected by the well known perforated card sorting methods and the several groups passed through a tabulating machine to prepare the bills. In order to save postage it is proposed according to the present invention to prepare these bills on post cards although, of course, the system is not to be limited to this manner of operation. Suitable feeding mechanism is provided to feed the post cards to the printing mechanism of the tabulator while the perforated ledger cards are fed through the accounting section. The tabulator is provided with mechanism to accumulate data from successive cards until certain classification data change, whereupon accumulating ceases until a total is taken of the items in the particular classification group.

Each customer's ledger cards constitute a different classification group. The post cards are fed to the platen of the tabulating machine by special feeding mechanism and the present reading, previous reading, consumption and amount due for the consumption are printed on the post card from each perforated ledger card. Incidentally the amount due is entered into an accumulator and at the end of the card group the total of the amount due for the particular consumer whose cards constitute the group is also printed on the post card. The line spacing for the several items on each post card is obtained from the usual line spacing mechanism of the tabulator and at the end of the group, after the total for the group has been printed, the special feeding mechanism feeds the printed post card out of the machine and feeds a blank post card into printing position to receive printed data from the following card group. Thus the consumers' itemized bills are obtained in convenient form directly from the ledger without any clerical or copying work.

The particular method of handling the ledger cards may vary. Ordinarily after the statements or bills are made and mailed the ledger cards are placed in a special container and as each bill is paid its particular ledger cards are withdrawn from the special container and placed in the permanent file. At the end of a certain period of time all the ledger cards remaining in the special container which now represent overdue accounts are again run through the tabulator and special follow-up notices are printed from them in the same manner as the original bills were printed. These ledger cards are then replaced in the special container and removed as before when the bills are paid. At the end of another period of time the ledger cards still remaining in the container may be again run through the tabulator to print special shut-off notices.

Another form of accounting might be employed in which the original bill, follow-up and shut-off notices would be printed in one operation on the original passing of the ledger cards through the tabulating machine. The number of follow-up and shut-off notices which are actually needed is small, however, and the former method is preferred.

The invention will now be explained more explicitly in connection with the accompanying drawings in which:

Fig. 1 shows a tabulating card punched to form a ledger according to the invention;

Fig. 2 shows a post card arranged as a bill and having amounts and totals printed from certain perforations of cards similar to that shown in Fig. 1;

Fig. 5 is an enlarged section on line 5—5 of Fig. 3;

Fig. 7 is a detail of the usual line spacing device for the platen of the tabulator;

Fig. 8 is a detail of a special platen operating device for effecting certain spacings necessary to the present system;

Referring to Fig. 1 a ledger card is shown which is punched to represent all the data pertaining to consumption of electricity for light for a certain consumer during an accounting period. This card is of well known form and carries indicia arranged in columns to represent the numerals from 0 to 9. The card is prepared from the meter read book and the book is identified by perforations in columns 13 to 16. The class of service, in the present case light, is represented by a perforation in the one position of column 17. A card dealing with water or power would be represented by a perforation in the two or three positions respectively of this column. In columns 19 to 29 are punched the present and previous meter readings and in columns 30 to 34 the difference, showing consumption of electricity for light during the period. These data are all taken from the meter read book. Columns 35 to 40 are punched to represent the amount due for the consumption shown in columns 30 to 34, and columns 42 to 45 are punched with a number identifying the consumer. This last number is the same for each card belonging to the consumer so that by means of it the consumer's cards may be sorted into groups and the data from each group separately added by a tabulating machine to obtain complete individual bills for the different consumers.

In Fig. 2 a bill in post card form is shown which has been prepared on a tabulating machine from ledger tabulating cards similar to that shown in Fig. 1. The ledger cards are sorted into consumers' groups, in the present instance consisting of a light consumption card followed by a water consumption card. By mechanism which will be hereinafter described a blank bill post card is first fed to the platen of the tabulating machine so that its first printing impression from a particular consumer's group of cards will occur along the line designated Light, the printing impression of the second card of the group will occur along the line designated Water. Cards for other commodities could be handled in a similar manner. At the end of the card group the total of the amount is printed along the line designated Due. The amount is the only total printed, as, of course, the totals of the other items would be meaningless. Preferably the post card is scored or perforated as at A to divide it into two readily detachable portions of which the left hand portion may constitute the consumer's receipt and the right hand portion the cashier's stub. The amounts due and their totals appear on both portions of the bill and hence this series of items and totals must be printed from the same columns of the ledger tabulating card from two different sets of type as will be hereinafter disclosed.

Figure 3:
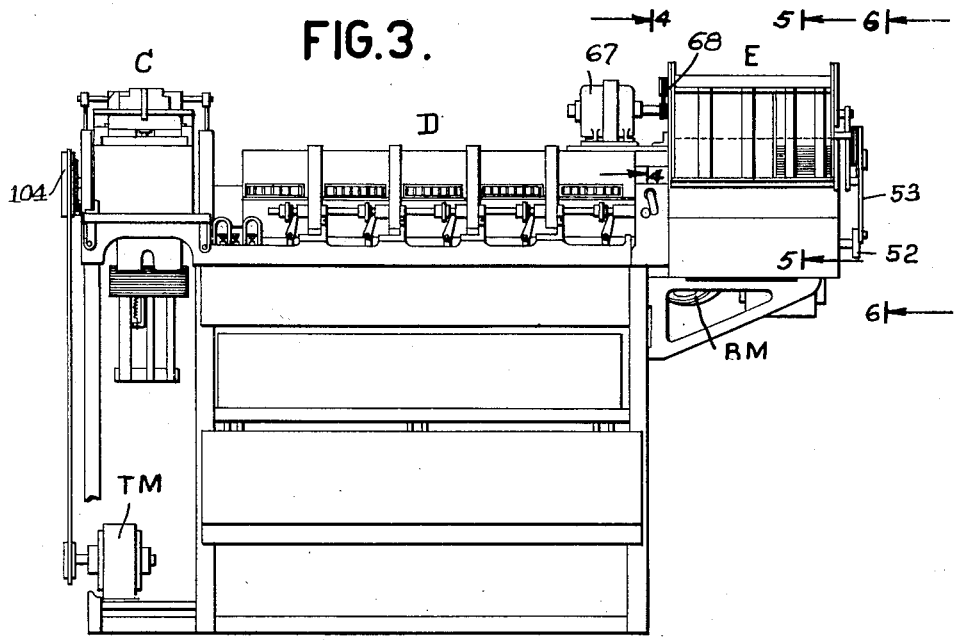
Fig. 3 shows a tabulator arranged to prepare bills as in Fig. 2 from ledger cards as in Fig. 1.
Figure 11:
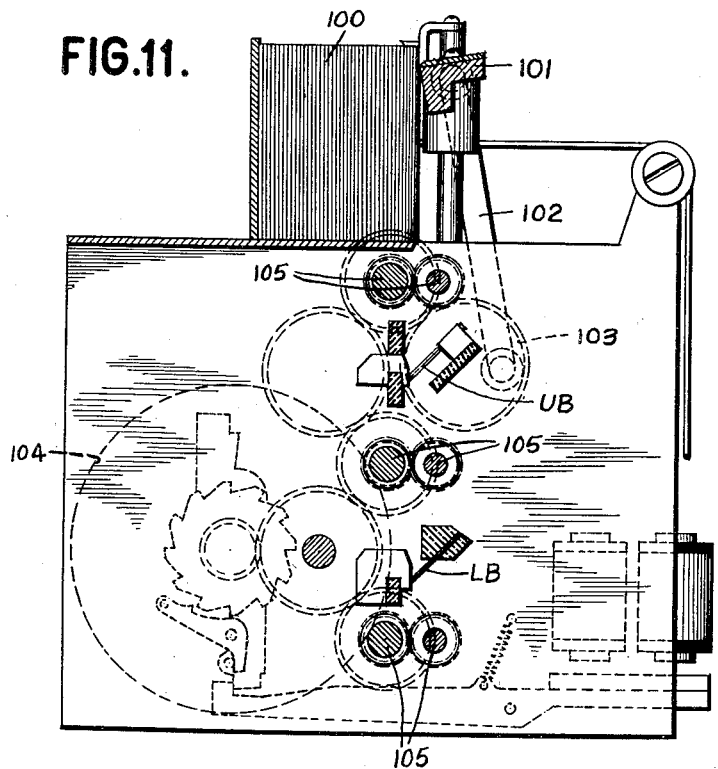
Fig. 11 is a detail section of the record card feeding mechanism.

A tabulator of well known type which is fully illustrated and described in U. S. Patent No. 1,762,145 to Daly and Page, dated June 10, 1930 is shown in Fig. 3. The machine as usual is provided with a tabulating card feed section illustrated at C, an accumulating section illustrated at D and a printing section illustrated at E which is provided with special feeding mechanism for feeding the bills or post cards. The tabulating card feed section is adapted to receive a stack of cards 100 (Fig. 11) which are fed by a picker 101 reciprocated up and down by a link 102 pivotally mounted and eccentrically mounted on the member 103 which is driven through a train of gears from the pulley 104, belt operated from the motor TM (Fig. 3). The cards are fed downwardly, one at a time, into the bite of the feed rollers 105 and past the brushes UB and LB. The printing section contains type bars coordinated to the counters so that the several amounts entered into the counters and the totals thereof may be printed. In the present example those columns of the ledger cards which contain perforations representing present reading, previous reading and consumption are each connected with an accumulator or counter so that the data may be printed from the associated printing bars.

These particular counters are arranged so that they will not total print as an accumulation of these particular figures would have no meaning. Those columns of the ledger cards which contain the amount perforations are connected with two separate counters so that the itemized amounts and their totals may be printed both on the consumer's receipt portion and the cashier's stub portion of the bill card. The columns of the ledger card containing the perforations of the bill number which identify the consumer automatically control the tabulator so that it will remain in operation as long as the card group of each customer is passing and cause it to print the total at the end of the group before accumulating starts on the following group.

The general arrangement of the post card or bill feeding mechanism is most clearly illustrated in Fig. 5. The platen of the tabulator is shown at 20 and opposite it, arranged for vertical movement, are the type bars 21 each of which carries a type head with ten type 22 representing the digits from 0 to 9. A rock shaft 23 rocks first clockwise and then counterclockwise during each printing cycle, both listing and taking, to first raise the different type 22 successively to printing position opposite the platen and then lower the type bar to home position. The perforated ledger cards are fed through the card feeding section synchronously with the movement of the type bars and suitable analyzing mechanism causes differentially timed electric impulses according to the location of the perforations in the several card columns. These impulses control electromagnetic devices to arrest the upward movement of the type bars so that the type 22 corresponding to the perforations are stopped in printing position and at a certain time hammers 24 are tripped to force the selected type against the platen 20 and cause printing. This is the listing operation. The total printing operation is entirely similar except that the differentially timed impulses which arrest the type bars originate from devices which feel out the position of the counter wheels and time the impulses according to the accumulated amounts standing on the counters. These operations are well known and fully described in the above mentioned patent and need no further explanation.

The bill post cards 25 (Fig. 5) are placed in a suitable hopper 26 from which they are fed one by one by means of a reciprocating picker 27 operating on the lowermost card of the stack. The picker operates on a total taking and reset operation and feeds the lowermost card into the bite of rolls 28. These rolls are also operated only on a reset and total taking operation but on this first card feeding movement they do not actually operate to feed the card. On the following reset and total taking operation the rolls 28 feed the card into the bite of a second set of feed rolls 31. The rolls 31 also operate during reset and during the third reset operation feed the card to the platen 20, in position to receive the first line of printing. After the operation is once started each reset and total taking operation feeds a fresh card to the platen. The platen in addition to its usual line spacing movement is given an extra movement on total taking and reset so that after the total is printed the card is fed into constantly running eject rolls 32 and 33 which deliver it to a discharge receptacle 34. These operations and the mechanisms for effecting them will be described in detail hereinafter but first the usual line spacing devices for moving the platen during listing will be briefly explained.

The rock shaft 23 (Fig. 5) rocks clockwise during each listing cycle and an arm 35 fixed thereto carries a pin 36 which rocks a frame 37 counterclockwise about its pivot 38. A link 41 pivoted to frame 37 is thereby lowered and rocks a lever 42 (see Fig. 7) about its pivot 43. The lever 42 has a pin and slot connection with a lever 44 freely supported on platen shaft 45. The lever 44 carries a spring pressed pivoted pawl 46 which cooperates with a ratchet wheel 47 fixed to shaft 45 and thereby feeds the platen one line space after each listing printing operation. This mechanism as usual serves to space the post card bills one line space after each item is printed on them.

Figure 4:
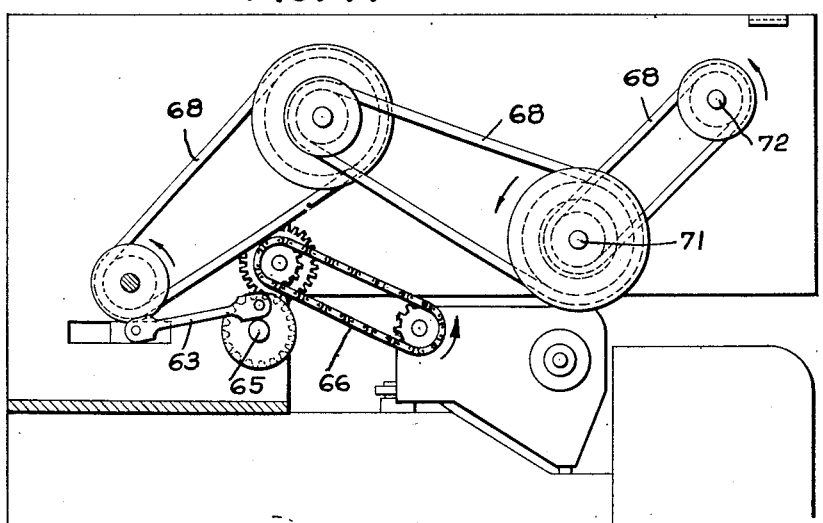
Fig. 4 is an enlarged section on line 4—4 of Fig. 3.
Figure 6:
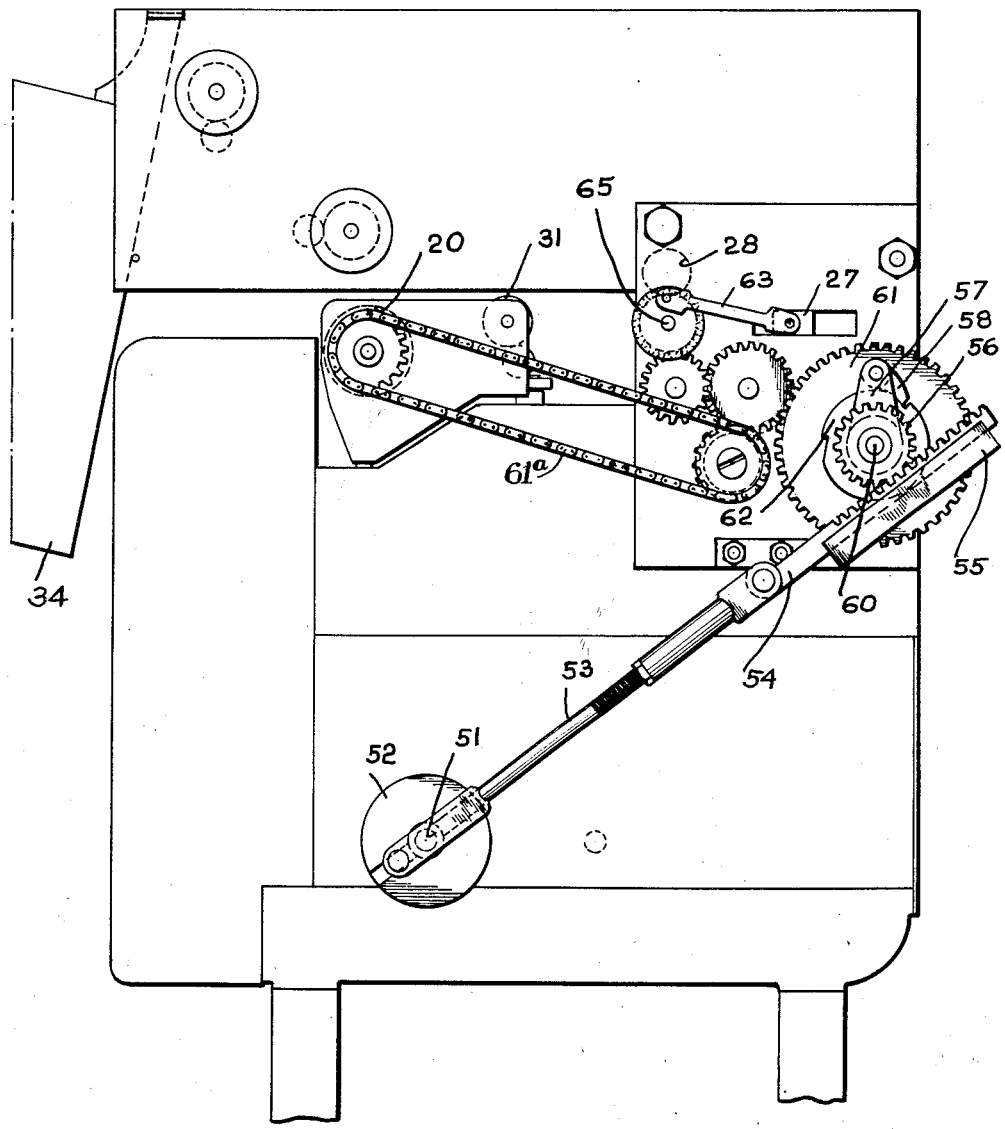
Fig. 6 is an end elevation from the right of Fig. 3 as indicated by line 3—3.
Figure 9:
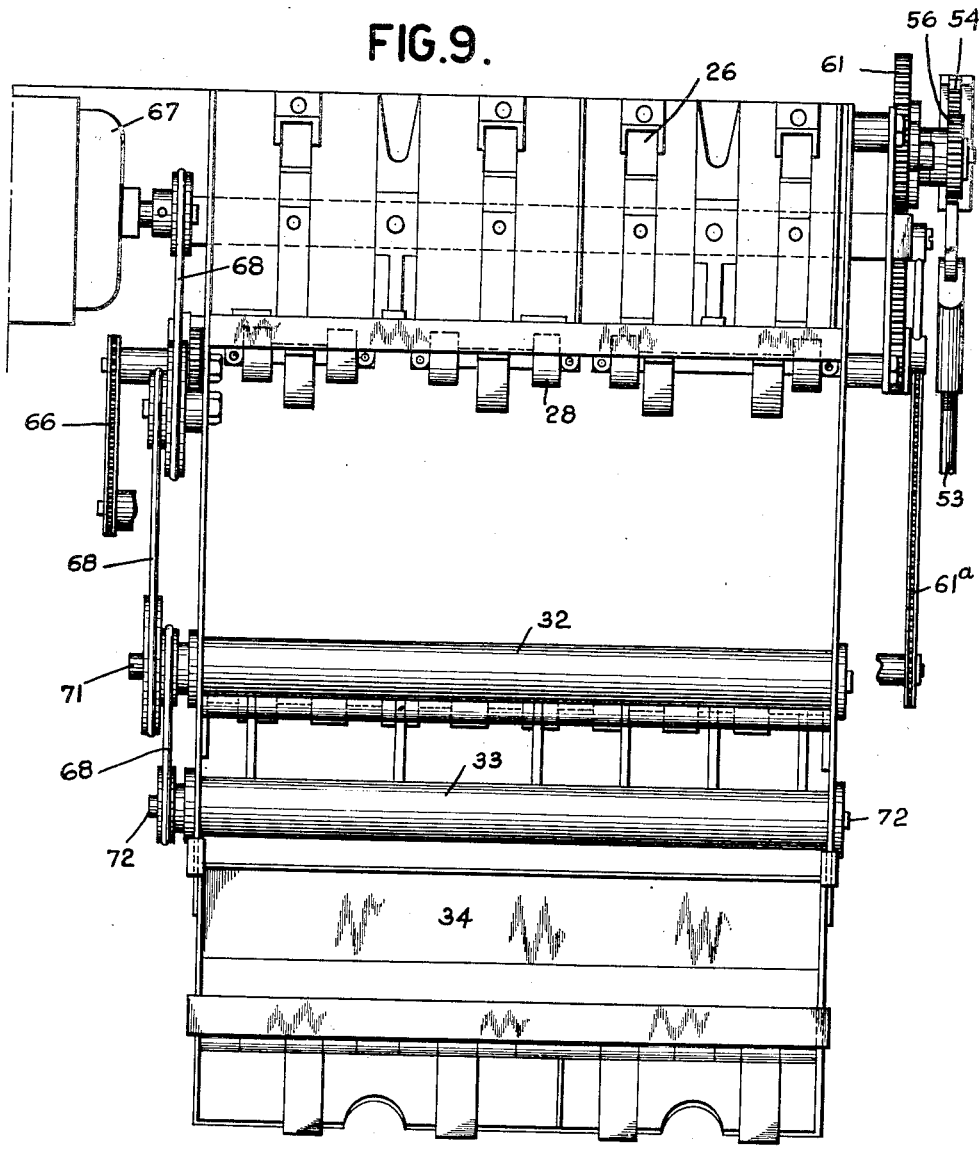
Fig. 9 is a plan view of the special bill feeding device according to the invention and illustrated at the right in Fig. 3.

The special feeding mechanism which operates after total printing to feed the printed bill free of the platen and to feed a fresh card bill to the platen is detailed in Figs. 4, 6 and 9. In Fig. 6 the total print shaft which makes one revolution on each total printing and reset operation is shown at 51. During the first half of its revolution total printing is effected and during the last half of its revolution the counters are reset to zero. The picker and the several special feed rolls are operated from this shaft during the last half of its revolution so that the special bill feeding operation occurs after total printing. A disk 52 is fixed to shaft 51 to operate a pitman 53 of adjustable length. The pitman reciprocates a rack 54 guided in a grooved block 55. The rack meshes with a gear 56 to which is fixed an arm 57 carrying a pivoted pawl 58. This arrangement, on rotation of the total print shaft 51, causes gear 56 to rotate substantially one-third of a revolution in a counterclockwise direction. Free on shaft 60 is a gear 61 having three times as many teeth as the gear 56 and fixed to the gear 61 is a disk 62 provided with three evenly spaced notches to cooperate with pawl 58. The gear 61 drives a gear train with a three to one ratio which reciprocates the picker 27 through links 63, one on each side of the structure, and drives the platen 20 through a chain and sprocket connection 61a. The sprocket connection to the platen 20 (see Fig. 8) includes a one way clutch 62a so that the platen may be line spaced by the usual line spacing mechanism without interference from this special drive.

The lower rolls 28 are mounted on the shaft 65 which carries the eccentrics for picker operating links 63 (Figs. 4 and 6) and the rolls 31 are driven from a chain and sprocket geared to this same shaft (Fig. 4). The constantly running eject rolls are driven by a special motor 67 (Fig. 3) through a belt and pulley arrangement shown at 68 in Fig. 4. In this latter figure the driving shafts of eject rolls 32 and 33 are shown at 71 and 72 respectively.

The operation and coordination of these mechanisms will be briefly explained in connection with Figs. 5 and 6. Assuming that a stack of post cards have just been placed in the hopper 26 it is first necessary to effect three reset operations of the tabulator to bring the lowermost one of the stack into its first printing position on the platen 20. The first reset operation on rotation of shaft 51 first moves rack 54 upward to the right and rotates gear 56 counterclockwise to bring pawl 58 into cooperation with one of the notches in disk 62. Then as the rack moves downward to the left gear 56 rotates clockwise and pawl 58 rotates disk 62 and attached gear 61 a third of a revolution. Owing to the three to one gear ratio this causes picker 27 to make one complete reciprocation and special feed rolls 28 and 31 to make one revolution. The picker 27 therefore feeds the lowermost card bill 25 into the bite of rolls 28. On the next reset operation rolls 28 feed this first bill to the bite of rolls 31 and the picker 27 feeds the next bill to rolls 28. On the third reset operation the first card bill is fed into printing position on the platen. After this the several items may be printed on the bill from the tabulating ledger cards. After each item the platen is stepped one line space by the usual line spacing mechanism. This line spacing has no effect on the special bill feeding device owing to the presence of the one way clutch in the latter shown in Fig. 8. After the first customer's tabulating cards are itemized and totaled the reset operation causes the special feeding mechanism to again function whereby the movement of the platen feeds the printed bill to the constantly running eject rolls 32 and 33 which deposit it in the discharge container 34. Incidentally a blank post card bill is fed to the platen.

The operation of the complete machine so that the previously described printing and adding operations may be accomplished will now be explained in connection with Fig. 10 which shows a simplified but substantially complete circuit diagram of the tabulator disclosed in the patent previously mentioned. During adding and listing operations the tabulator is driven by the tabulating motor TM which is controlled by a group of circuits and relays in the upper right hand figure of the drawings. During totaling and reset operations the tabulator is driven by reset motor RM controlled through associated circuits and contacts. Both of these motors are so arranged that the machine performs complete cycles after they are once started. In order that the counters of the machine may be cleared of previous data for starting a tabulating run, the circuits are arranged so that a reset cycle must precede the first adding cycle. As previously explained, three reset cycles are necessary to get the first bill post card onto the platen. To simplify the explanation, it may be assumed that automatic restart switch 81 is open at this time. The three reset cycles may be obtained by depressing the reset key R three separate times, waiting each time until the reset operation is complete. The closure of the contacts of reset key R establishes a circuit through the reset motor in series with the total clutch T which is a one revolution clutch serving to clutch the total print and reset mechanisms to the drive shaft of the motor. Immediately after starting a cam contact P—1 closes shortcircuiting the initial circuit for the reset motor. Toward the end of the cycle the cam contacts P—1 open and stop the reset motor at the end of a single reset operation. After three such operations, the first post card has been fed to the platen in position to receive its first line of printing.

It is now necessary to start the tabulating ledger cards through the machine and owing to the particular construction of the present machine, two card feeding cycles are necessary for this purpose. It may be assumed for the sake of simplicity that the automatic total switch 82 is open and that the two cycles are to be obtained by separate depressions of the start key ST. The previous reset operations, through closure of lower contacts P—3 operated by the reset motor, energize a motor control relay 83 closing its contacts 83a, and after the reset operation the circuit of motor control relay 83 is maintained through a stick circuit controlled by relay 85 and including automatic control contacts 91a. After one card feeding cycle the machine stops because the automatic control system is not yet in operation as no card has reached the lower brushes and the failure of the automatic control contacts 91a to make during the cycle breaks the circuit of the motor control relay 83 opening its contacts 83a to stop the tabulating motor TM at the end of the cycle. At this time another reset cycle is necessary to again energize the motor control relay 83 and one of the three previous ones serving to feed the first post card to the platen may profitably be saved until this time to avoid unnecessary machine operations. The switches 81 and 82 may now be closed so that at the end of each card group automatic totaling will be initiated and after the totaling the machine may automatically start tabulating on the following card group. The start key ST is now again depressed to feed the first card to the lower brushes of the machine whereupon the machine remains in continuous operation, totaling at the end of each card group being initiated by contacts 86 which close as soon as tabulating and card feed ceases and cam contacts L—1 which close toward the end of each tabulating cycle. Automatic restart is controlled through the cam contacts P—1 which close toward the end of each totaling cycle and which are in parallel with the start key contacts ST so that their closure has the same effect as depressing the start key. These operations are well understood but the mechanism of the group control will be briefly explained.

Figure 10:
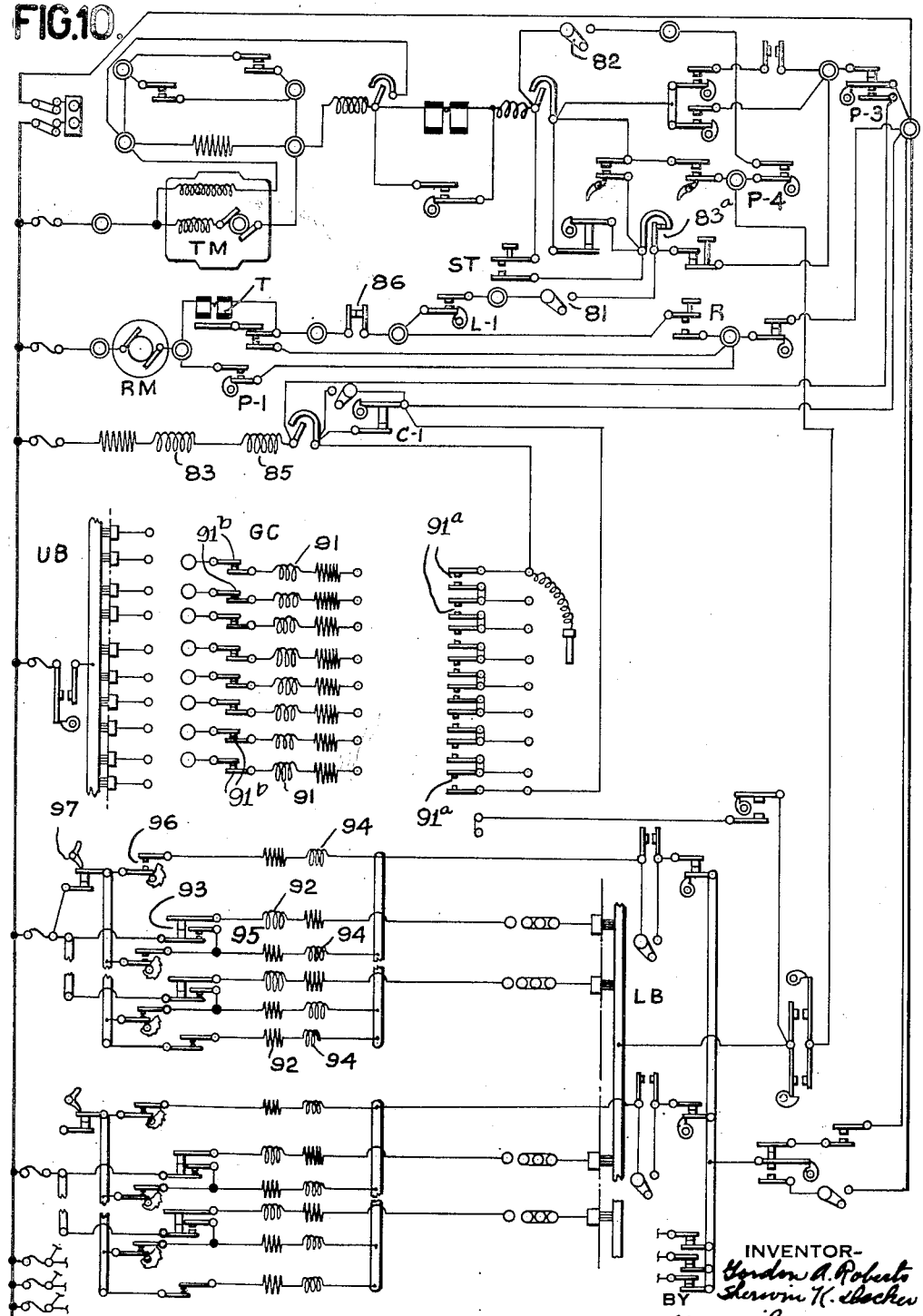
Fig. 10 is a circuit diagram of a complete tabulator on which bills or statements may be prepared according to the invention.
Figure 12:
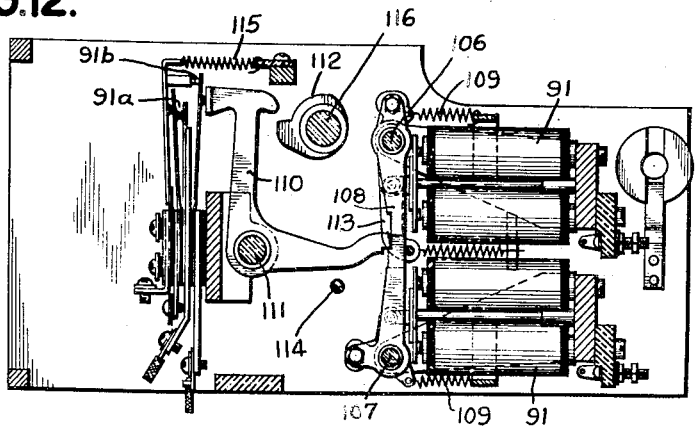
Fig. 12 is a detail section of the automatic control mechanism.

The automatic group control which is described in detail in the patent to Lake, No. 1,822,594, dated September 8, 1931, includes contacts 91b and magnets 91 (Figs. 10 and 12). The function of contacts 91b is to open after the energization of the magnet 91 and takes the arc from the upper brushes UB which are plugged in to the group control at that time in the usual manner. The energization of the magnets 91 is adapted to close corresponding contacts 91a to establish the control circuit serially through all the contacts 91a. The manner in which these contacts are operated may be briefly described in connection with Fig. 12 in which the control magnets 91 are arranged in upper and lower tiers in a suitable housing underneath the base of the machine (not shown). Disposed to one side of the magnets are shafts 106 and 107 which carry pivoted thereon upper and lower finger members 108. Suitably connected to these finger members are the armatures of the control magnets 91, and the fingers are normally held away from the magnets by suitable springs 109. A shaft 111 which is suitably supported in the control unit forms a support for a plurality of bell crank members 110. One arm of each bell crank member rests normally in a shoulder abutment on the finger member 108. The other arm bears against an insulated plug carried by one of the blades of a pair of spring contacts 91b. Contacts 91b are normally closed.

Upon energization of any magnet 91, its corresponding finger 108 is rocked releasing its cooperating bell crank member 110 and permitting the same to rock clockwise under the resiliency of the cooperating spring contact which normally tends to move to open position. The said bell crank member is arrested by a rod 114 extending transversely across the control unit. This action causes contacts 91b to open and permits the closing of contacts 91a under the influence of spring 115 which is insulated from the frame member. Once per card cycle cam 112 carried by shaft 116, which is geared to the tabulating machine drive shaft, contacts with tail portions on the bell cranks 110 and rocks the latter counterclockwise thus permitting springs 109 to restore the armature fingers 108 which thereupon relatch the bell cranks 110. Any fingers not properly restored by the spring action are restored by a restoring bail 113 which is pivoted upon the shaft 106 and is actuated at the proper time in the cycle by another cam (not shown) on shaft 116.

At the completion of these operations, the bell cranks 110 are relatched on the fingers 108 and are ready for the next card cycle, contacts 91b being closed and 91a open.

The group control unit indicated at GC serves to keep the machine in tabulating operation as long as classification data in selected columns does not change in successive cards and to interrupt tabulating when this data changes. In the present case, columns 42 to 45 (see Fig. 1) of the tabulating cards has been selected for the group control data, this data in the present case being the bill number which identifies the several customers. The lower brushes LB corresponding to these columns are plugged to the four lower control magnets 91 and plugging for group control is completed through the four corresponding upper brushes UB. As the cards with their perforations pass the upper and lower brushes the magnets 91 will be energized at some time in the cycle when the perforations in the columns 42 to 45 agree and at least one of these magnets will remain deenergized throughout the cycle when the control perforations in cards under the upper and lower brushes fail to agree. Whenever a magnet 91 is energized during the cycle, its contacts 91a close and remain closed until toward the end of the cycle. These contacts 91a are wired in series with each other and the particular ones selected for group control are connected in parallel with the cam contacts C—1 included in the circuit of the motor control relay 83. The contacts C—1 open each tabulating cycle after the tabulating operation is complete but before the time of opening for the contacts 91a. If all contacts 91a which are plugged for automatic control are closed when the cam contacts C open, another adding and listing cycle ensues while if any pair of these contacts 91a is open when the contacts C open, motor control relay 83 is deenergized opening its contacts 83a and stopping the tabulating motor TM whereupon automatic totaling ensues.

Referring again to Fig. 1, columns 19 to 34 of the tabulating cards are to be printed but not added. For this purpose the lower brushes LB corresponding to these columns are plugged to counter magnets 92. As the cards pass the lower brushes their perforations cause differentially timed impulses to pass through the counter magnets and enter the numbers represented by the perforations onto the associated counters. Energization of the counter magnets 92 automatically breaks their own circuits through contacts 93 and makes the circuit of printer magnets 94 through contacts 95. This gives the differential operation for arresting the type bars shown in Fig. 5 in proper position to print the numbers the type bars being controlled by magnets 94. The total is printed from totaling contacts 96 which cooperate with stepped cams on the counter wheels and are rocked during totaling to feel out the position of the cams thereby energizing the printing magnets 94 at differential times in accordance with the data standing on the counter. Each counter is provided with a zero button 97 controlling the total printing circuits so that these circuits may be cut out of operation if total printing is not desired. In the present case totals of the quantities in these particular columns are not desired so the zero buttons 97 for the particular counters involved are opened.

Referring again to Figs. 1 and 2, it will be noted that the data in the amount column are printed twice, once on the consumer's receipt portion of the bill and again on the cashier's stub portion. The lower brushes corresponding to these columns 35 to 40 are therefore plugged to two separate counters so that they may be separately accumulated and printed on the two parts of the bill. The zero buttons 97 of these counters are closed so that the total will be printed on the bill at the end of each group.

The operation of the machine will now be briefly summarized. The post card bills 25 are first placed in the hopper 26 and the corresponding tabulating ledger cards are placed in the card feeding section of the machine. Three reset cycles and two card feeding cycles are then initiated through the reset key R and the start key ST. The card feeding cycles serve to feed the first card under the lower brushes and the reset cycles serve to feed the first post card into printing position on the platen 20. The machine is now started in automatic operation. As long as a single customer's group of cards is passing the automatic control contacts 91a maintain the tabulating motor in operation so that the data from each card is printed on the bill. At the end of the card group the automatic control contacts 86 fail to close, adding operation is interrupted and total taking operation instituted whereupon the total of the amount is printed on the bill. Directly after total taking, the bill post card is fed to the discharge stack and an inserted fresh bill fed to the platen. At the end of this total taking operation the machine automatically resumes adding on the following group of cards whereupon the operation is repeated.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a record controlled accounting machine, means for feeding controlling records and means for feeding individual slips for receiving records from the controlling records, common driving mechanism for operating the two feeding means and connections intermediate the driving mechanism and the feeding means for feeding the controlling records with an uninterrupted motion and the individual slips with an intermittent motion.

2. In a record controlled accounting machine, including an automatic control system for interrupting accumulating operations at the end of record groups, means for feeding controlling records and means for feeding individual slips for receiving records from the controlling records, common driving mechanism for operating the two feeding means, connections intermediate the driving mechanism and the feeding means for feeding the controlling records with an uninterrupted motion and the individual slips with an intermittent motion and independently driven ejecting means for the individual slips, and means controlled by the automatic control system to feed the slips to the ejecting means.

3. In a record controlled accounting machine, a first conveyor for feeding controlling records and a second conveyor for feeding individual slips to receive records from the controlling records, a driving shaft for said conveyor systems, rotary elements driven thereby for operating the first conveyor with a steady motion and a reciprocatory element driven by said shaft for operating the second conveyor.

4. In a record controlled accounting machine, a first conveyor comprising rolls for feeding controlling records and a second conveyor comprising rolls for feeding individual slips to receive records from the controlling records, a driving shaft for said rolls, connections consisting of rotary elements intermediate said shaft and said first conveyor for driving its rolls with a steady motion and connections intermediate said shaft and said second conveyor including a reciprocatory element connected to the rolls through a one way drive mechanism for driving the rolls with an intermittent motion.

5. In a record controlled accounting machine, means for feeding controlling records and means for feeding individual slips with an intermittent motion to receive printed impressions under control of said controlling records, a platen arranged to provide a printing position angularly disposed with respect to the path of said slips and guiding means associated with the individual slip feeding means for guiding the slips into printing position with respect to said platen.

6. In a record controlled machine having means for feeding controlling records and recording mechanism controlled by the records, means for automatically feeding individual slips into position to be operated upon by the recording mechanism and having provisions called into operation by the controlling records to feed the slips out of recording position after completion of a recording operation.

7. In a record controlled machine having means for feeding controlling records and recording mechanism controlled by the records, means for automatically feeding individual slips into and out of position to be operated upon by recording mechanism said means having provisions for feeding the slips into position to leave a heading space thereon and having provisions called into operation by the controlling records for feeding the slips out entirely free of the recording mechanism after completion of the recording operation.

8. In a record controlled accounting machine having recording mechanism and record controlled mechanism for operating the same, means for feeding individual slips into position to receive records from the recording mechanism and record controlled means for operating said feeding means to feed the individual slips entirely free from record receiving position after it has been operated upon by the recording mechanism.

GORDON A. ROBERTS.
SHERWIN K. DECKER.